(12) United States Patent
Lu

(10) Patent No.: US 8,384,969 B2
(45) Date of Patent: Feb. 26, 2013

(54) TRANSMISSION DEVICE

(75) Inventor: Wen-Jen Lu, Taipei County (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 380 days.

(21) Appl. No.: 12/774,733

(22) Filed: May 6, 2010

(65) Prior Publication Data

US 2011/0228357 A1 Sep. 22, 2011

(30) Foreign Application Priority Data

Mar. 19, 2010 (TW) ................................ 99108174 A

(51) Int. Cl.
*H04N 1/04* (2006.01)
(52) U.S. Cl. ......... 358/498; 358/474; 358/475; 358/497
(58) Field of Classification Search .................. 358/498, 358/474, 475, 497, 496
See application file for complete search history.

(56) References Cited

U.S. PATENT DOCUMENTS

| 2003/0160979 A1* | 8/2003 | Tuchtenhagen | 358/1.6 |
| 2005/0030596 A1* | 2/2005 | Chen et al. | 358/474 |
| 2005/0209614 A1* | 9/2005 | Fenter et al. | 606/153 |
| 2008/0018044 A1* | 1/2008 | Kim | 271/109 |

* cited by examiner

*Primary Examiner* — Houshang Safaipour
(74) *Attorney, Agent, or Firm* — Jianq Chyun IP Office

(57) ABSTRACT

A transmission device for driving an automatic document feeder (ADF) and a scanner individually is provided. The transmission device includes a transmission shaft, an actuator, a first transmission module coupled to the scanner, a second transmission module coupled to the ADF, and a power switching module. The actuator is movably attached around the transmission shaft. The power switching module is assembled to the transmission shaft. When the power switching module is coupled to the first transmission module and the transmission shaft rotates in a first direction such that the scanner moves to a first position, the scanner drives the actuator to drive the power switching module to be coupled to the second transmission module. When the transmission shaft rotates in a second direction, the power transmission module is coupled to the first transmission module to drive the scanner to move away from the transmission device.

9 Claims, 8 Drawing Sheets

TRANSMISSION DEVICE

CROSS-REFERENCE TO RELATED APPLICATION

This application claims the priority benefit of Taiwan application serial No. 99108174, filed on Mar. 19, 2010. The entirety of the above-mentioned patent application is hereby incorporated by reference herein and made a part of this specification.

BACKGROUND OF THE INVENTION

1. Field of the Invention

The present invention relates to a transmission device, and more particularly, to a transmission device capable of individually driving an automatic document feeder (ADF) and a scanner.

2. Description of Related Art

Following development in software and hardware, scanners have become standard equipment for many computer users. The scanner can scan texts or images of documents, magazines, books and pictures into a computer for processing.

To scan a document, the document is placed horizontally on a scanning unit, and the scanning unit is driven by a transmission mechanism for scanning the document. The transmission mechanism includes a motor, a gear group disposed on a scanning unit, and a transmission belt. In another manner, the scanning unit remains stationary but the document to be scanned is moved by a transmission mechanism, which can also achieve the scanning purposes.

SUMMARY OF THE INVENTION

Accordingly, the present invention is directed to a transmission device for individually driving an automatic document feeder and a scanner.

One embodiment of the present invention provides a transmission device for individually driving an automatic document feeder and a scanner. The transmission device includes a transmission shaft, an actuator, a first transmission module coupled to the scanner, a second transmission module coupled to the automatic document feeder, and a power switching module. The actuator is movably attached around the first transmission shaft. The power switching module is assembled to the first transmission shaft. When the power switching module is coupled to the first transmission module and the first transmission shaft rotates in a first direction such that the scanner moves toward the transmission device to a first position, the scanner drives the actuator to drive the power switching module to be coupled to the second transmission module. When the first transmission shaft rotates in a second direction opposite to the first direction, the power switching module is coupled to the first transmission module and drives the scanner to move away from the transmission device.

In one embodiment of the present invention, the power switching module comprises a V-shaped lever, a first gear, and a second gear. The V-shaped lever is attached around the first transmission shaft for rotation with the first transmission shaft. The first gear is disposed at a distal end of the V-shaped lever. The second gear is disposed at another distal end of the V-shaped lever. When the first transmission shaft rotates in the first direction, the first gear is coupled between the first transmission shaft and the first transmission module. When the first transmission shaft rotates in the second direction, the second gear is coupled between the first transmission shaft and the first transmission module.

In one embodiment of the present invention, the actuator has an inclined plane. When the scanner drives the actuator to move relative to the first transmission shaft from a second position to a third position, the actuator pushes the V-shaped shaft with the inclined plane such that the first gear is moved away from the first transmission module.

In one embodiment of the present invention, the power switching module further includes a clutch disposed on the first transmission shaft and between the V-shaped shaft and the second transmission module. When the scanner drives the actuator to move relative to the first transmission shaft from the second position to the third position, the actuator pushes the V-shaped shaft with the inclined plane and drives the clutch to be coupled to the second transmission module.

In one embodiment of the present invention, the power switching module further comprises an elastic element engaged between the second transmission module and the clutch. When the clutch is coupled to the second transmission module, the clutch and the second transmission module compress the elastic element. When the actuator moves from the third position back to the second position, the elastic restoring force of the elastic element drives the clutch to move away from the second transmission module.

In one embodiment of the present invention, the power switching module further comprises a third gear disposed on the first transmission shaft for rotation with the first transmission shaft, such that the first transmission individually drives the first gear and the second gear through the third gear.

In one embodiment of the present invention, the actuator includes a main body and a positioning member disposed in the main body. When the scanner moves to the first position, the positioning member interferes with the scanner such that the actuator is connected and mounted to the scanner.

In one embodiment of the present invention, the first transmission module comprises a fourth gear coupled to the power switching module and a transmission belt coupled between the fourth gear and the scanner.

In one embodiment of the present invention, the second transmission module comprises a fifth gear coupled to the automatic document feeder; and a second transmission shaft coupled between the power switching module and the fifth gear.

In view of the foregoing, in the above embodiments of the present invention, the transmission device can individually drive the scanner and the automatic document feeder by using the power switching module. This makes it unnecessary to design a set of transmission mechanism for each of the scanner and automatic document feeder, thus effectively reducing the fabrication complexity and cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purposes of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the tennis "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
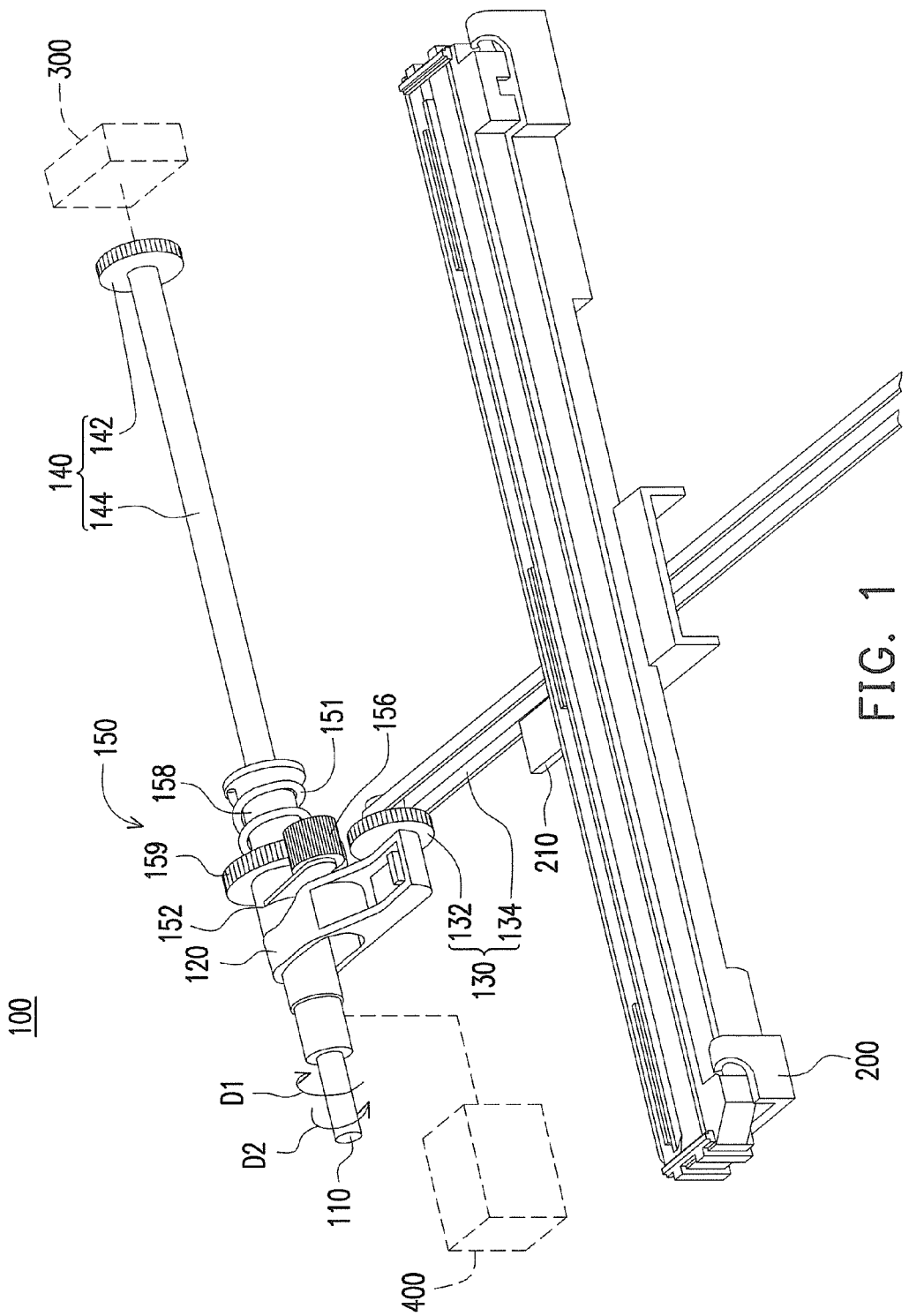
FIG. 1 illustrates a transmission device according to one embodiment of the present invention.

FIG. 1 illustrates a transmission device according to one embodiment of the present invention. In the present embodiment, the transmission device 100 is adapted to individually drive a scanner 200 and an automatic document feeder (ADF) 300. It is noted, however, that this exemplary application of the transmission device 100 described herein is for the purposes of illustration only and should not be regarded as limiting. Rather, the transmission device 100 is adapted to be mounted between devices with different transmission modes so as to individually drive these devices with different transmission modes by power switching.

The transmission device 100 includes a first transmission shaft 110, an actuator 120, a first transmission module 130 coupled to the scanner 200, a second transmission module 140 coupled to the ADF 300, and a power switching module 150. The first transmission shaft 110 is connected to a power source 400, such as, a motor, to drive the first transmission shaft 110 to rotate in a first direction D1 or an opposite second direction D2. The actuator 120 is movably attached around the first transmission shaft 110. The power switching module 150 is assembled to the first transmission shaft 110.

Figure 2:
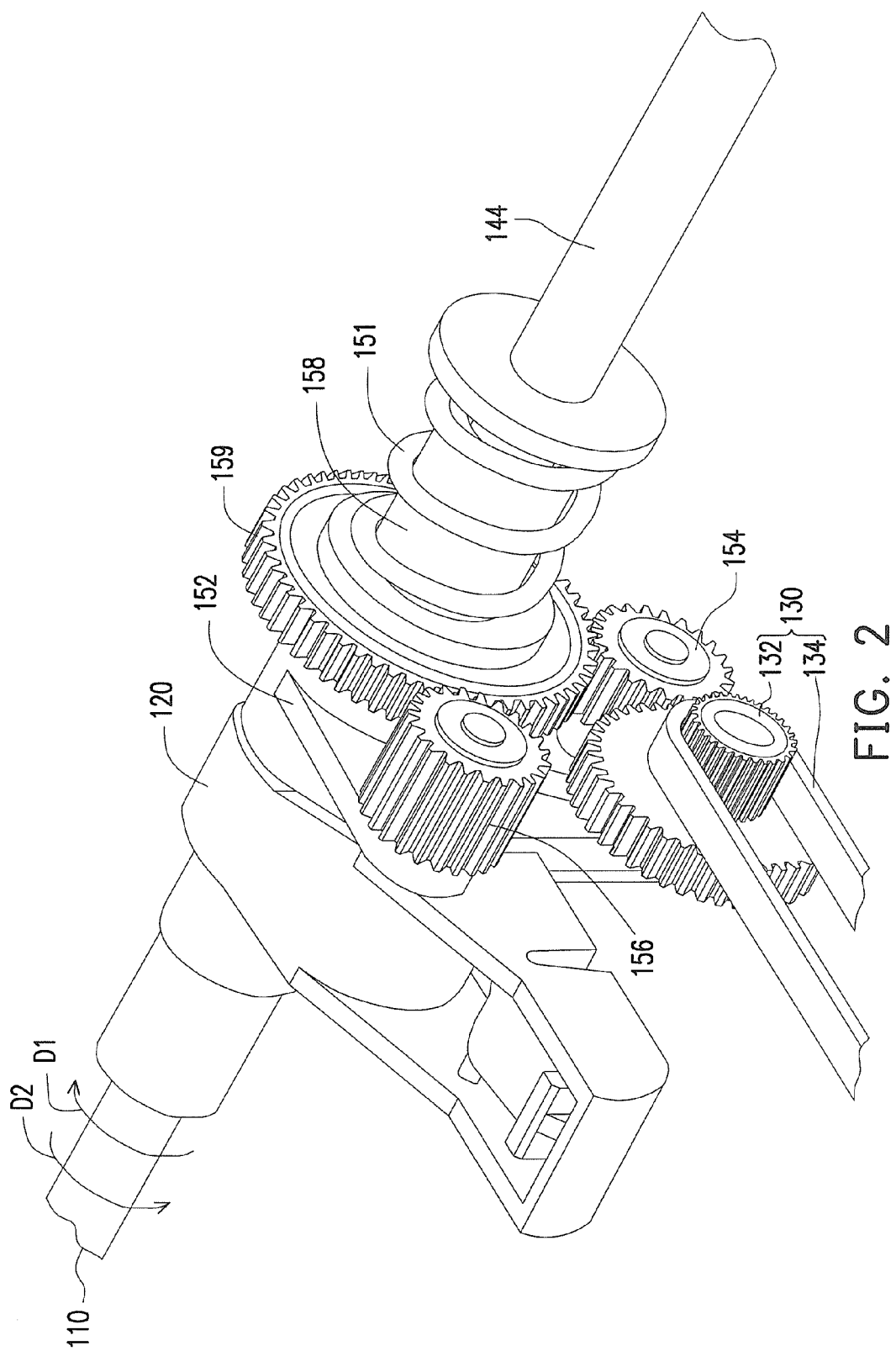
FIG. 2 is a partial view of the transmission device of FIG. 1.

FIG. 2 is a partial view of the transmission device of FIG. 1. Referring to FIG. 1 and FIG. 2, in the present embodiment, the power switching module 150 includes a V-shaped lever 152, a first gear 154, and a second gear 156. The V-shaped lever 152 is attached around the first transmission shaft 110 for rotation with the first transmission shaft 110. The first gear 154 and the second gear 156 are disposed at two distal ends of the V-shaped lever 152, such that the V-shaped lever 152, when rotating with the first transmission shaft 110, can swing the first gear 154 and the second gear 156.

The power switching module 150 further includes a third gear 159 disposed on the first transmission shaft 110 for rotation with the first transmission shaft 110. The first transmission module 130 includes a fourth gear 132 and a transmission belt 134. The fourth gear 132 is coupled to the power switching module 150, and the transmission belt 134 is coupled between the fourth gear 132 and the scanner 200.

When rotating in the first direction D1, the first transmission shaft 110 drives the V-shaped lever 152 of the power switching module 150 to rotate in the first direction D1, such that the first gear 154 is engaged between the third gear 159 and the fourth gear 132, thus enabling the scanner 200 to move toward the transmission device 100.

On the contrary, when rotating in the second direction D2, the first transmission shaft 110 drives the V-shaped lever 152 to rotate in the second direction D2. At this time, the second gear 156 is engaged between the third gear 159 and the fourth gear 132, such that the transmission device 100 can drive the scanner 200 to move away from the transmission device 100.

Figure 3:
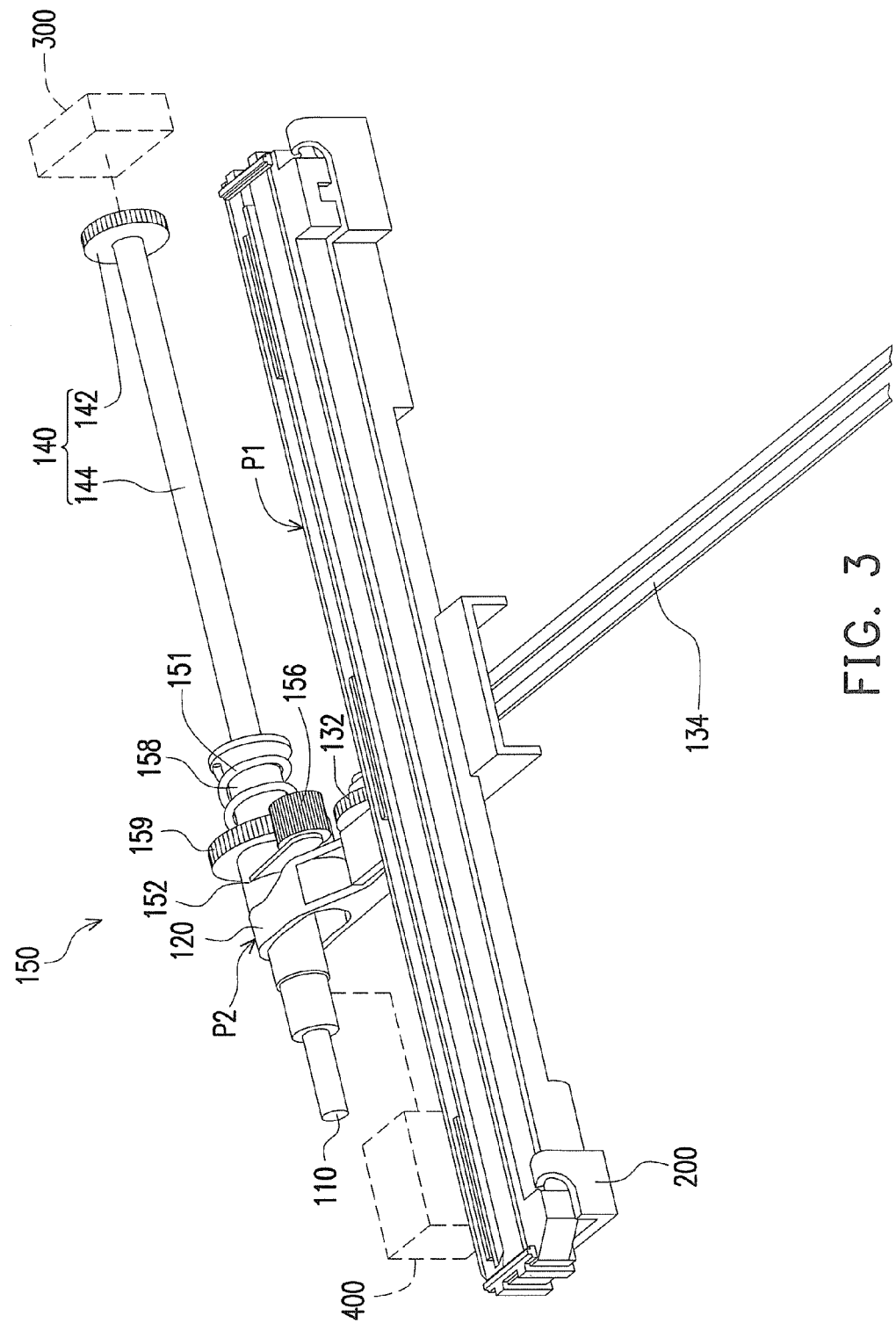
FIG. 3 illustrates the scanner of FIG. 1 moved to a first position.
Figure 4:
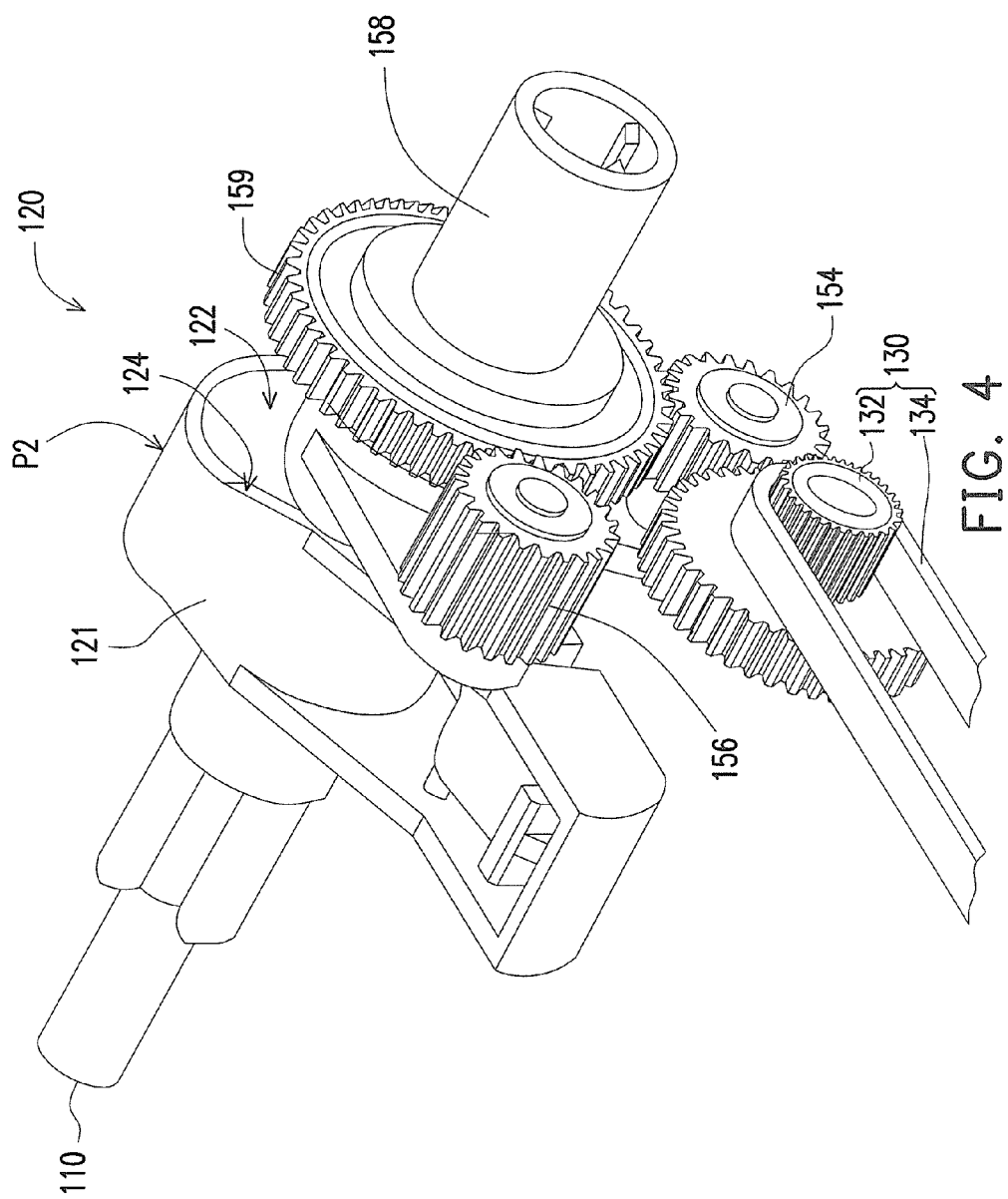
FIG. 4 and FIG. 5 are partial views of the transmission device of FIG. 3, viewed from different aspects.
Figure 5:
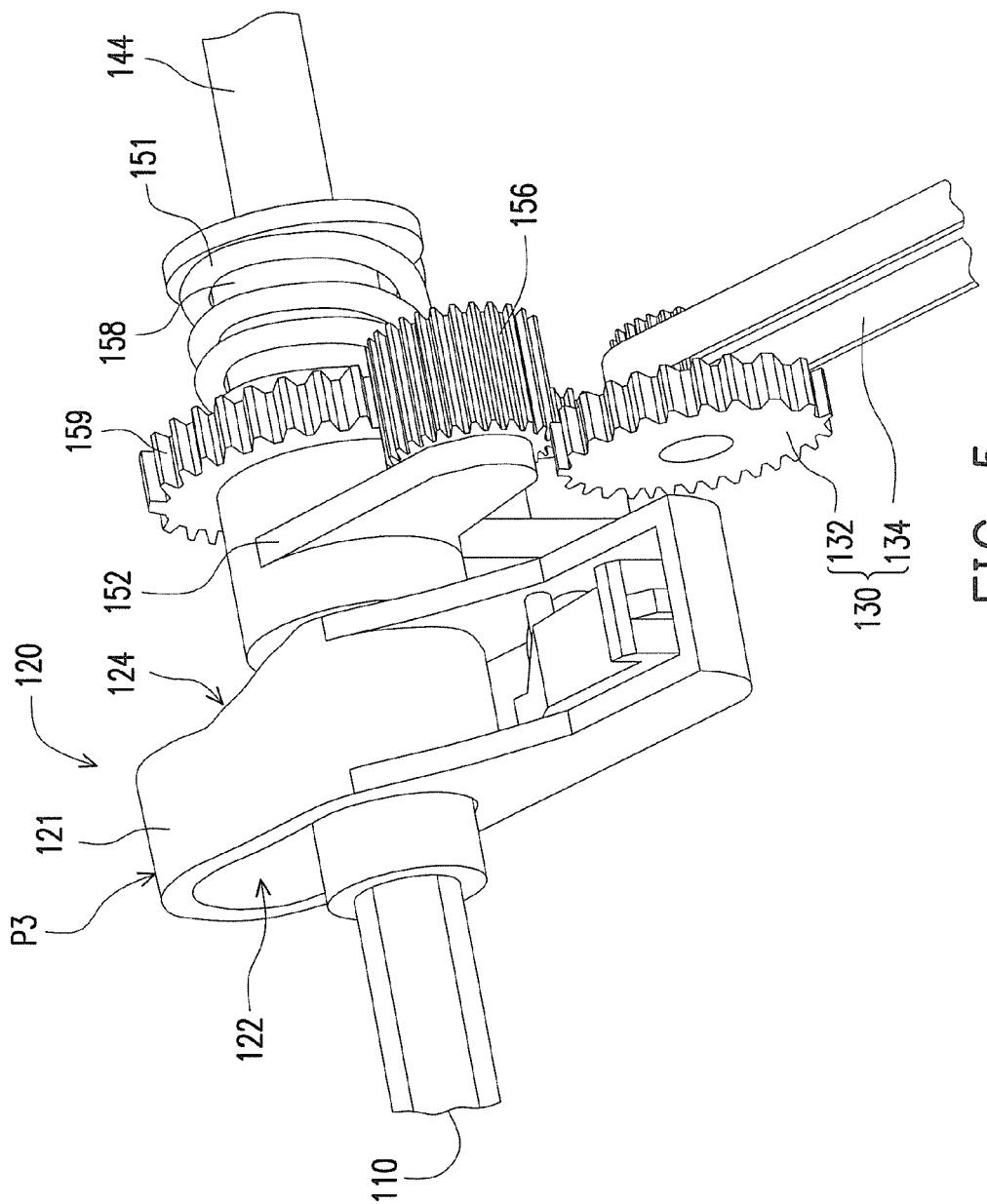

FIG. 3 illustrates the scanner of FIG. 1 moved to a first position. FIG. 4 and FIG. 5 are partial views of the transmission device of FIG. 3, viewed from different aspects. Referring to FIGS. 3 to 5, in the present embodiment, the actuator 120 has a bore 122 and an inclined plane 124. The bore 122 permits the actuator 120 to be movably attached around the first transmission shaft 110. In addition, the second transmission module 140 includes a fifth gear 142 and a second transmission shaft 144. The fifth gear 142 is coupled to the ADF 300, and the second transmission shaft 144 is coupled between the power switching module 150 and the fifth gear 142. The power switching module 150 further includes a clutch 158 disposed between the first transmission shaft 110 and the second transmission shaft 144.

When the transmission device 100 drives the scanner 200 to move toward the transmission device 100 to a first position P1 through the power switching module 150, the scanner 200 drives the actuator 120 to move along the bore 122 from a second position P2 to a third position P3, such that the actuator 120 pushes the V-shaped lever 152 with its inclined plane 124 and drives the clutch 158 to be coupled to the second transmission shaft 144.

It is noted that because the thickness of the first gear 154 is less than the thickness of the fourth gear 132, when the actuator 120 pushes the V-shaped lever 152 with its inclined plane 124, it causes a misalignment between the first gear 154 and the fourth gear 132 at the same time (i.e. the first gear 154 is pushed forward to become disengaged from the fourth gear 132), such that the power of the first transmission shaft 110 rotating in the first direction D1 cannot be transmitted to the first transmission module 130. In other words, at this time, the power of the first transmission shaft 110 can be transmitted to the second transmission module 140 through the clutch 158, thereby enabling the transmission device 100 to drive the ADF 300.

Figure 6:
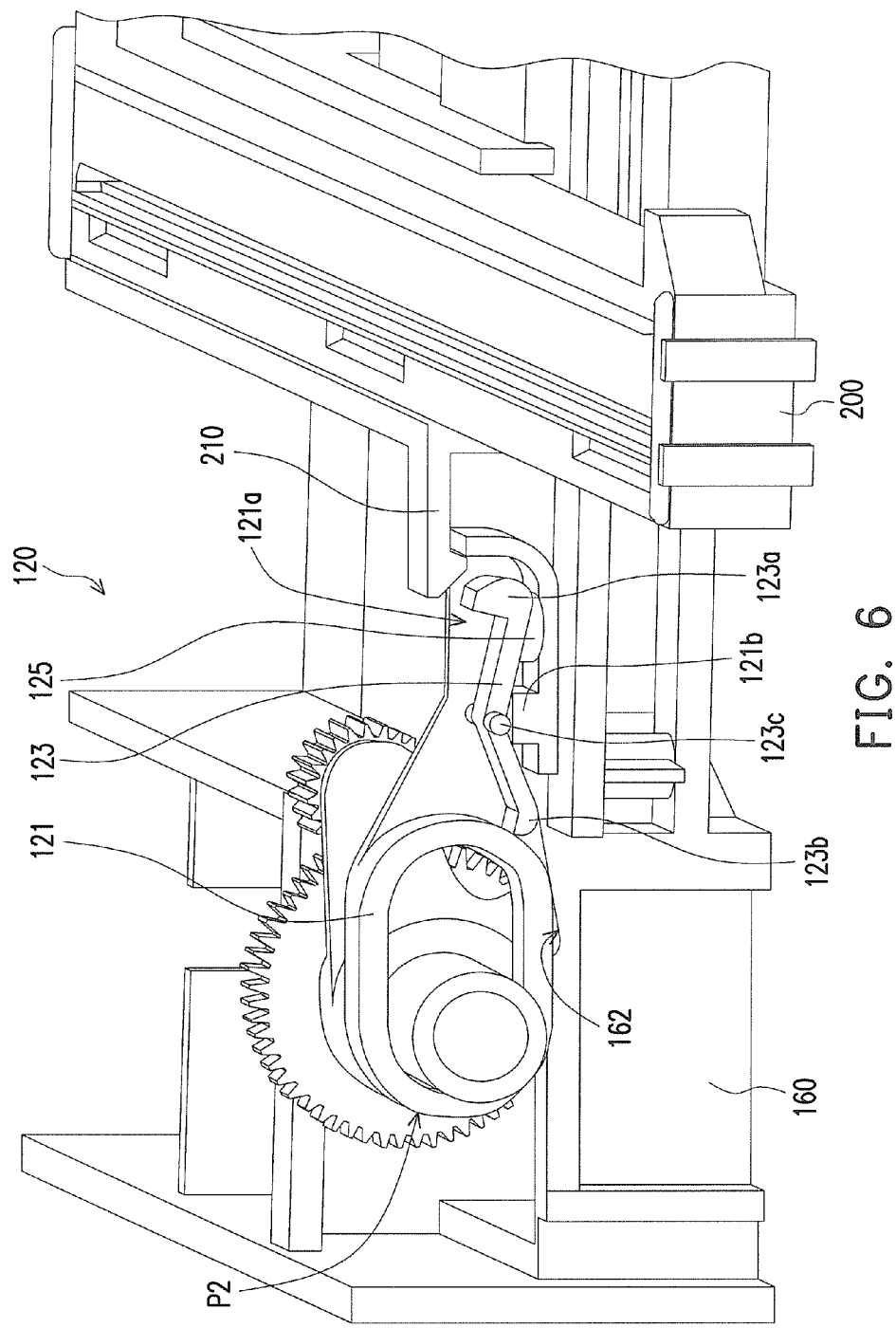
FIG. 6 and FIG. 7 are partial cross-sectional views of the transmission device and scanner of FIG. 3 in different states.
Figure 7:
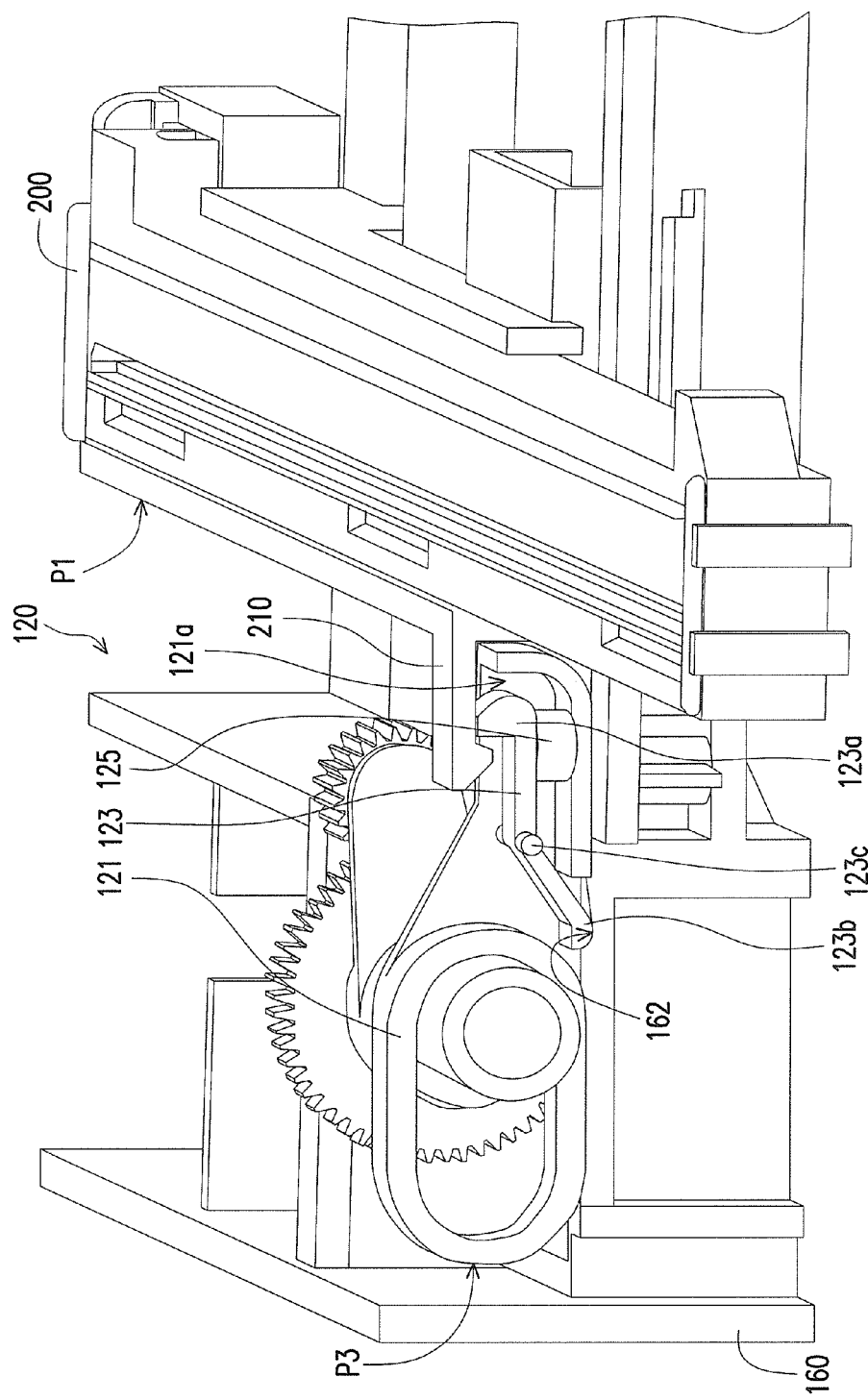

FIG. 6 and FIG. 7 are partial cross-sectional views of the transmission device and scanner of FIG. 3 in different states. Referring to FIGS. 6 and 7, in the present embodiment, the actuator 120 includes a main body 121, a positioning member 123, and a first spring 125. The main body 121 has a receiving slot 121a, the bore 122, and the inclined plane 124. The positioning member 123 is rotatably disposed in the main body 121. The positioning member 123 includes a latch portion 123a, a positioning portion 123b, and a support portion 123c between the latch portion 123a and the positioning portion 123b. The positioning member 123 is supported on a protrusion 121b of the main body 121 by the support portion 123c. The latch portion 123a is received in the receiving slot 121a and is exposed out of the main body 121. The first spring 125 is disposed in the receiving slot 121a and engaged between the latch portion 123a of the positioning member 123 and the main body 121, such that the positioning member 123 is rotatably retained in the main body 121.

In the present embodiment, the transmission device 100 further includes a base 160. The first transmission shaft 110, actuator 120, second transmission module 140, and power switching module 150 are all disposed on the base 160. The base 160 has a positioning slot 162 and the positioning portion 123b of the positioning member 123 that is not engaged with the first spring 125 rests on the base 160.

In addition, the scanner 200 includes a hook 210 corresponding to the positioning member 123. When the scanner 200 is moved to the first position P1 and drives the actuator 120 to move from the second position P2 to the third position P3, the positioning portion 123b is positioned in the positioning slot 162. At this time, the resilient force of the first spring 123 drives the hook 210 to engage with the latch portion 123a of the positioning member 123. As such, the scanner 200 can be connected and mounted to the transmission device 100. This can maintain the scanner 200 to be connected with the transmission device 100 when the scanner 200 is not driven by the transmission device 100, thereby preventing the scanner 200 from freely moving to damage other components or becoming disengaged from the transmission device 100 and hence going out of control during subsequent operations.

Figure 8:
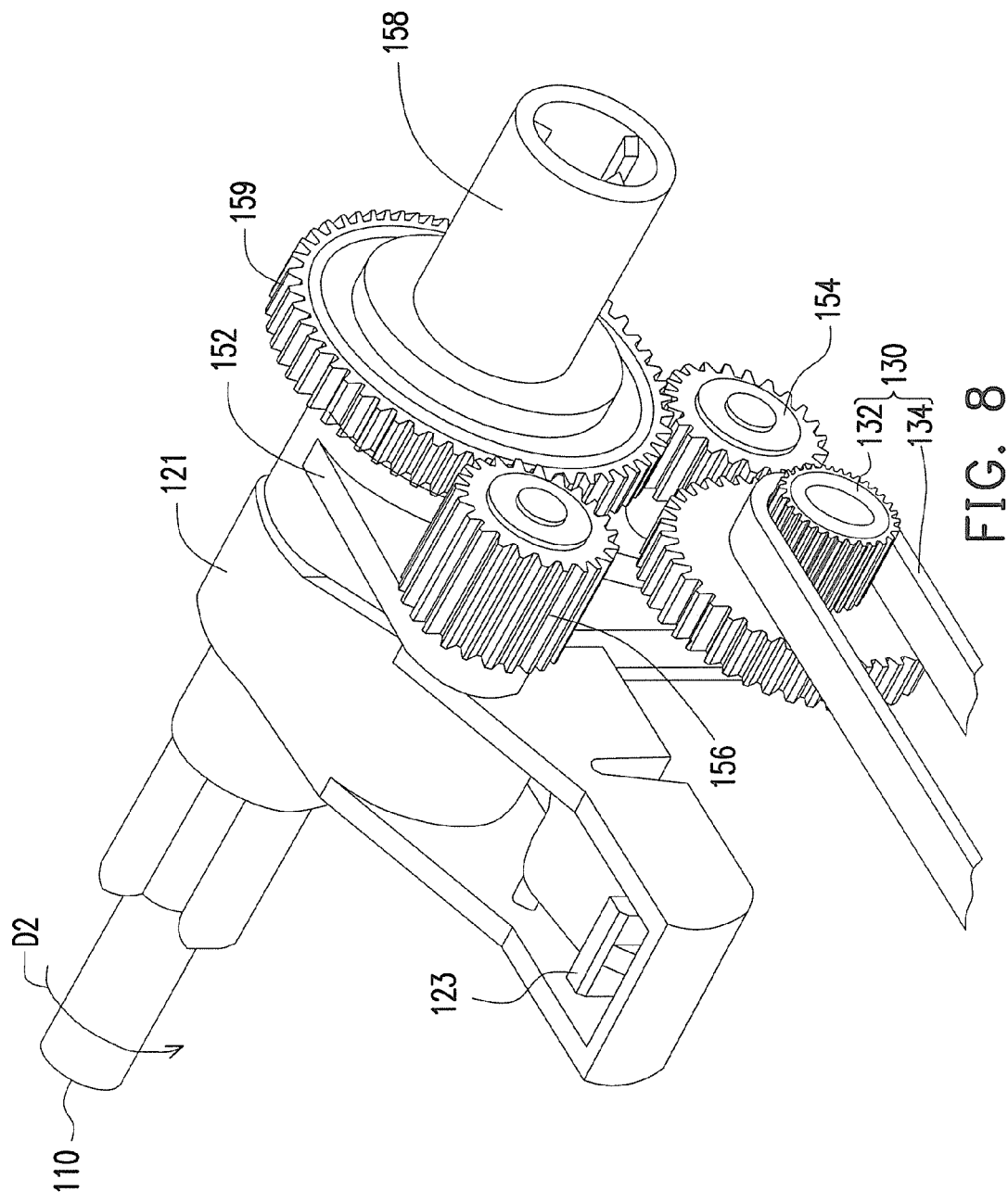
FIG. 8 is a partial view of the transmission device of FIG. 4 in another state.

FIG. 8 is a partial view of the transmission device of FIG. 4 in another state. Referring to FIG. 8, as in the embodiment of FIG. 3 to FIG. 6, the first transmission shaft 110 is coupled to the second transmission module 140 through the power switching module 150 such that the transmission device 100 can drive the ADF 300. Afterwards, when the first transmission shaft 110 rotates in the second direction D2, the first transmission shaft 110 drives the V-shaped lever 150 to rotate in the second direction D2. At this time, the second gear 156 is engaged between the third gear 159 and the fourth gear 132, such that the power of the first transmission shaft 110 is transmitted to the first transmission module 130 through the second gear 156. As such, the transmission device 100 can drive the scanner 200 to move away from the transmission device 100.

More specifically, referring to FIG. 6 to FIG. 8, when moving away from the first position P1, the scanner 200 drives the positioning portion 123b of the positioning member 123 to move away from the positioning slot 162 of the base 160 and at the same time drives the main body 121 of the actuator 120 from the third position P3 back to the second position P2 through the hook 210. Then, the latch portion 123a of the positioning member 123 is released from the hook 210 of the scanner 200 because of the influence of the contour of the base 160 on the positioning portion 123b of the positioning element 123. At this time, the scanner 200 is disengaged from the actuator 120 and returns to its original state in which the scanner 200 is controlled by the transmission device 100 for back-and-forth movement.

In addition, referring again to FIG. 3, the power switching module 150 further includes a second spring 151 engaged between the second transmission shaft 144 of the second transmission module 140 and the clutch 158. When the clutch 158 is coupled to the second transmission module 140, the clutch 158 and the second transmission shaft 144 cooperatively compress the second spring 151. When the scanner 200 moves away from the transmission device 100 and drives the actuator 120 from the third position P3 back to the second position P2, the clutch 158 is moved away from the second transmission shaft 144 under the influence of the restoring force of the second spring 151, to ensure that the power switching module 150 can be restored to the state in which the power switching module 150 had not been pushed by the actuator 120.

In summary, in embodiments of the present invention, the transmission device can individually drive the scanner and the ADF by using the power switching module. This makes it unnecessary to design a set of transmission mechanism for each of the scanner and ADF, thus effectively reducing the fabrication complexity and cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A transmission device adapted for individually driving an automatic document feeder and a scanner, the transmission device comprising:
   a first transmission shaft;
   an actuator movably attached around the first transmission shaft;

a first transmission module coupled to the scanner;
a second transmission module coupled to the automatic document feeder; and
a power switching module assembled to the first transmission shaft, the power switching module coupled to the first transmission module to drive the scanner, the power switching module coupled to the second transmission module to drive the automatic document feeder,
wherein when the power switching module is coupled to the first transmission module and the first transmission shaft rotates in a first direction such that the scanner moves toward the transmission device to a first position, the scanner drives the actuator to drive the power switching module to be coupled to the second transmission module, when the first transmission shaft rotates in a second direction opposite to the first direction, the power switching module is coupled to the first transmission module and drives the scanner to move away from the transmission device.

2. The transmission device according to claim 1, wherein the power switching module comprises:
a V-shaped lever attached around the first transmission shaft for rotation with the first transmission shaft;
a first gear disposed at a distal end of the V-shaped lever; and
a second gear disposed at another distal end of the V-shaped lever, wherein when the first transmission shaft rotates in the first direction, the first gear is coupled between the first transmission shaft and the first transmission module, when the first transmission shaft rotates in the second direction, the second gear is coupled between the first transmission shaft and the first transmission module.

3. The transmission device according to claim 2, wherein the actuator has an inclined plane, when the scanner drives the actuator to move relative to the first transmission shaft from a second position to a third position, the actuator pushes the V-shaped shaft with the inclined plane such that the first gear is moved away from the first transmission module.

4. The transmission device according to claim 3, wherein the power switching module further includes a clutch disposed on the first transmission shaft and between the V-shaped shaft and the second transmission module, when the scanner drives the actuator to move relative to the first transmission shaft from the second position to the third position, the actuator pushes the V-shaped shaft with the inclined plane and drives the clutch to be coupled to the second transmission module.

5. The transmission device according to claim 4, wherein the power switching module further comprises an elastic element engaged between the second transmission module and the clutch, when the clutch is coupled to the second transmission module, the clutch and the second transmission module compress the elastic element, when the actuator moves from the third position back to the second position, the elastic restoring force of the elastic element drives the clutch to move away from the second transmission module.

6. The transmission device according to claim 2, wherein the power switching module further comprises a third gear disposed on the first transmission shaft for rotation with the first transmission shaft, such that the first transmission shaft individually drives the first gear and the second gear through the third gear.

7. The transmission device according to claim 1, wherein the actuator includes a main body and a positioning member disposed in the main body, when the scanner moves to the first position, the positioning member interferes with the scanner such that the actuator is connected and mounted to the scanner.

8. The transmission device according to claim 1, wherein the first transmission module comprises:
a fourth gear coupled to the power switching module; and
a transmission belt coupled between the fourth gear and the scanner.

9. The transmission device according to claim 1, wherein the second transmission module comprises:
a fifth gear coupled to the automatic document feeder; and
a second transmission shaft coupled between the power switching module and the fifth gear.

* * * * *